(12) United States Patent
Martin et al.

(10) Patent No.: US 6,568,382 B2
(45) Date of Patent: May 27, 2003

(54) ARCHERY BOWS, CONNECTOR APPARATUSES FOR ARCHERY BOW ACCESSORIES, AND METHODS FOR REMOVABLY SECURING ARCHERY BOW ACCESSORIES TO ARCHERY BOWS (75) Inventors: Dan J. Martin, Walla Walla, WA (US); Dave Conlee, Milton-Freewater, OR (US)

(73) Assignee: Martin Archery, Inc., Walla Walla, WA (US)

( * ) Notice: Subject to any disclaimer, the term of this patent is extended or adjusted under 35 U.S.C. 154(b) by 46 days.

(21) Appl. No.: 09/967,509

(22) Filed: Sep. 28, 2001

(65) Prior Publication Data

US 2003/0062033 A1 Apr. 3, 2003

(51) Int. Cl.7 ............................. F41B 5/06; F41B 5/14; F16B 21/00
(52) U.S. Cl. ..................... 124/86; 124/25.5; 403/322.2
(58) Field of Search .............................. 124/86, 87, 88, 124/89, 25.5, 25.7; 403/263, 322.2; 224/916

(56) References Cited

U.S. PATENT DOCUMENTS

| | | | |
|---|---|---|---|
| 3,293,347 A | * 12/1966 | Wooding | |
| 4,263,718 A | 4/1981 | Smith | ........................ 33/265 |
| 4,318,630 A | * 3/1982 | Herchenbach et al. | |
| 4,615,326 A | 10/1986 | Rathbun | ...................... 124/88 |
| 4,662,347 A | 5/1987 | Carlton | ......................... 124/87 |
| 4,703,745 A | 11/1987 | Hammond | ................ 124/41 A |
| 4,709,454 A | * 12/1987 | Barnes | |
| 4,788,961 A | 12/1988 | Toth | ............................ 124/24 |
| 4,889,102 A | 12/1989 | Martin | ........................ 124/88 |
| 4,967,722 A | 11/1990 | Roberts | .................... 124/44.5 |
| 5,239,977 A | 8/1993 | Thomas | ....................... 124/89 |
| 5,520,164 A | * 5/1996 | Huddleston | |
| 5,657,741 A | * 8/1997 | Todd | ............................ 124/89 |
| 5,911,215 A | 6/1999 | Fisher et al. | .................. 124/86 |
| 5,947,531 A | 9/1999 | Eckard et al. | .............. 285/319 |

* cited by examiner

Primary Examiner—John A. Ricci
(74) Attorney, Agent, or Firm—Wells St. John P.S.

(57) ABSTRACT

A connector apparatus for removably securing an archery bow accessory to an archery bow. The connector apparatus includes a female member removably secured to an archery bow and defines an opening to a first bore that extends along a bore axis. At least one ball bearing is configured within the female member for radial movement relative the bore axis. The at least one ball bearing has a peripheral portion within the first bore. A male member includes a first portion configured for removably securing an archery bow accessory thereon. The male member includes a second portion that is spaced from the first portion and configured for positioning axially past the at least one ball bearing relative the opening with the peripheral portion of the at least one ball bearing biased radially more proximate the bore axis than a periphery defined by the second portion.

34 Claims, 8 Drawing Sheets

FIG. 4

ARCHERY BOWS, CONNECTOR APPARATUSES FOR ARCHERY BOW ACCESSORIES, AND METHODS FOR REMOVABLY SECURING ARCHERY BOW ACCESSORIES TO ARCHERY BOWS

TECHNICAL FIELD

The invention pertains to archery bows, connector apparatuses for archery bow accessories, and methods for removably securing archery bow accessories to archery bows.

BACKGROUND OF THE INVENTION

The archery industry continues to develop archery bow accessories to enhance the enjoyment of the sport. Some exemplary archery bow accessories are configured for attachment directly to an archery bow to facilitate use of the archery bow. For example, quiver assemblies are developed to removably secure arrows to a bow.

Designing archery bow accessories to be removably secured to a bow has advantages. Such provides the opportunity to interchange accessories on a single bow thereby increasing the versatility of the single bow. For example, one accessory may be designed for use during target practice or archery competition, while another accessory may be designed for use during hunting. If the two accessories are configured to be removably secured to the bow, and interchangeable, the same bow can be provided for the different archery activities. Another advantage is the bow can be made lightweight and compact for long travels and hiking in dense brush, for example, during hunting.

Accordingly, accessories are designed to be removably secured to bows. For example, an exemplary design and method includes an accessory having a threaded shaft to be received in complementary fashion in a threaded bore provided in the bow. The action of threading the accessory in a bow (and alternatively out) may include several revolutions to properly secure the accessory to the bow. Moreover, other existing designs and methods use tools for removably securing an accessory to a bow which increases the time to attach/detach the accessory. The industry is continually striving to simplify methods for removably securing an accessory to a bow.

Accordingly, it would be desirable to develop improved connector apparatuses and methods to removably secure archery bow accessories to archery bows. Furthermore, it would be desirable to develop connector apparatuses and methods that simplify attaching and detaching an accessory to a bow.

BRIEF DESCRIPTION OF THE DRAWINGS

Preferred embodiments of the invention are described below with reference to the following accompanying drawings.

SUMMARY OF THE INVENTION

In one aspect, the invention includes a connector apparatus for removably securing an archery bow accessory to an archery bow. The connector apparatus includes a female member removably secured to an archery bow and defines an opening to a first bore that extends along a bore axis. At least one ball bearing is configured within the female member for radial movement relative the bore axis. The at least one ball bearing has a peripheral portion within the first bore. A male member includes a first portion configured for removably securing an archery bow accessory thereon. The male member includes a second portion that is spaced from the first portion and configured for positioning axially past the at least one ball bearing relative the opening with the peripheral portion of the at least one ball bearing biased radially more proximate the bore axis than a periphery defined by the second portion.

In another aspect, the invention includes an archery bow. The archery bow includes a handle that has a first end opposite a second end, and the handle defines a first opening. A female member removably is received in the first opening. The female member defines a second opening to a bore extending along a bore axis, and the female member has an outer surface. A plurality of ball bearings is secured in the female member. At least some of the plurality of ball bearings are configured for radial movement relative the bore axis with peripheral portions of the at least some of the plurality of ball bearings outward of the outer surface during the radial movement. The at least some of the plurality of ball bearings are peripherally spaced about the bore in a plane perpendicular to the bore axis. A sleeve defines an inner bore configured to slide axially over the outer surface of the female member and engage and bias the at least some of the plurality of ball bearings radially toward the bore axis. A first limb extends outwardly from the first end of the handle and a second limb extends outwardly from the second end of the handle. At least one string extends between distal ends of the limbs.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
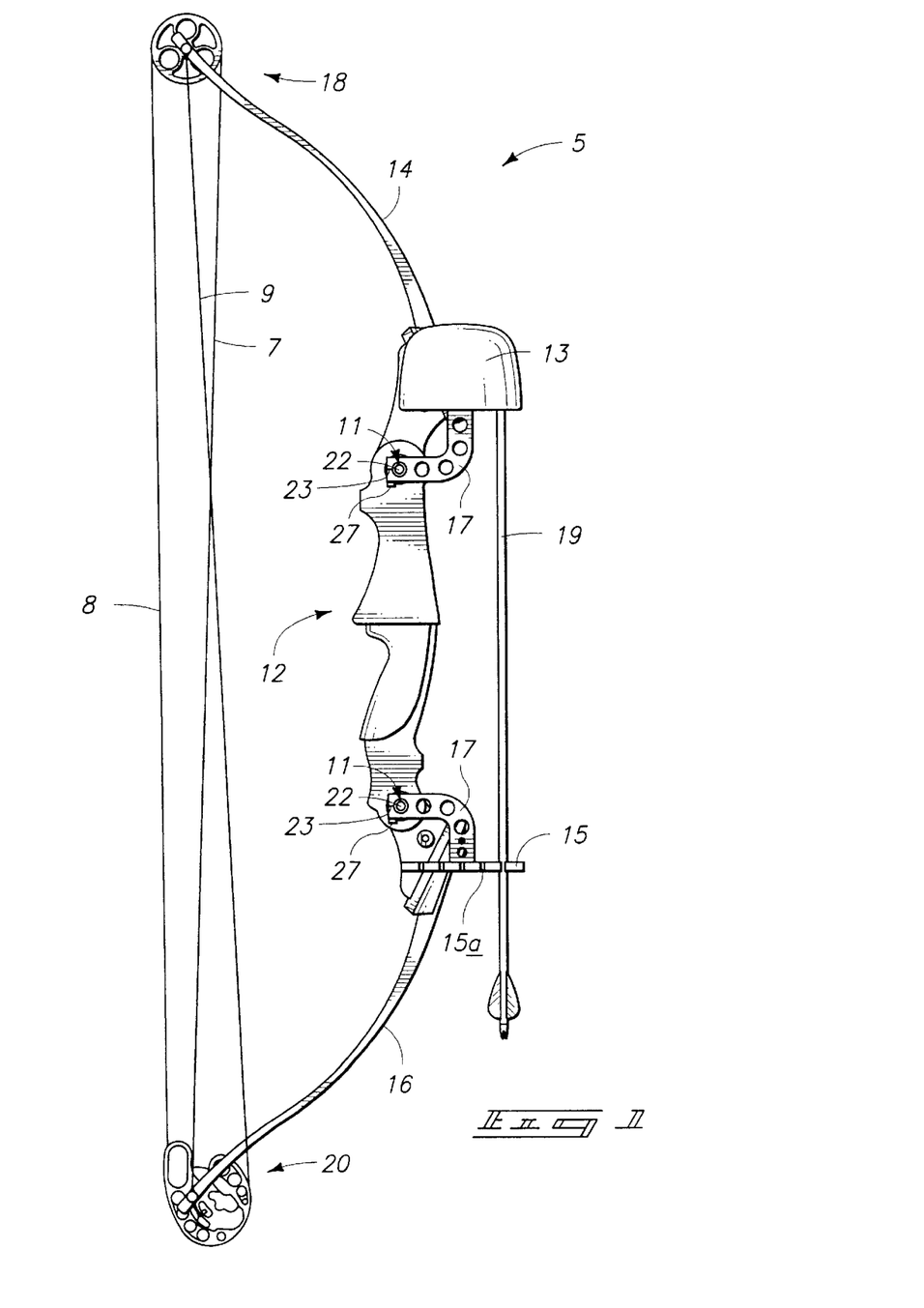
FIG. 1 is a diagrammatic side view of an archery bow in accordance with an embodiment of the present invention.

FIG. 1 illustrates an embodiment of an archery bow 5 in accordance with the present invention. Archery bow 5 includes a central elongated handle or body 12 having resilient limbs 14 and 16 secured to opposite ends of the handle 12. Archery bow 5 further includes rotating members 18 and 20 rotatably secured to limbs 14 and 16, respectively.

A cable, or drawstring 8 extends between limbs 14 and 16 over respective rotating members 18 and 20. A plurality of cables 7 and 9, for example power cables, extend between first and second limbs 14 and 16. The illustrated archery bow is commonly referred to as a compound bow. However, other bows could be employed, such as recurve and longbows, without departing from the principles and scope of the invention. Furthermore, this exemplary compound bow illustrates rotating member 18 as a pulley and rotating member 20 as a camming device. However, other compound bows could be employed, for example, wherein rotating members 18 and 20 are both camming devices, and further wherein the camming apparatuses have different designs.

The exemplary archery bow 5 further includes a pair of identical connector apparatuses 11 secured to handle 12 in spaced relation. It should be understood that one connector apparatus 11 may be used without departing from the principles and scope of the invention. The connector apparatuses 11 include several components (shown and described subsequently) that cannot be seen from this perspective. One such component defines a cylinder 22 that extends outwardly of handle 12 (perpendicularly outward of page) to receive one end of a bracket 17. An archery bow accessory is removably mounted to an other end of bracket 17, and thus, to bow 5. An exemplary bow accessory includes a quiver to removably attach a plurality of arrows 19 to bow 5. An exemplary quiver has two components, a hood 13 removably fastened to one connector apparatus 11, and an arrow clip 15 removably fastened to the other connector apparatus 11. The hood 13 receives the pointed end (not shown) of arrow 19 and the arrow clip 15 defines slots 15a to receive a portion of a shaft of arrow 15 to secure the arrow 15 to bow 5. Other exemplary bow accessories may be secured to bow 5, for example, archery bow stabilizers, sighting mechanisms and arrow rests such that only one connector apparatus 11 would be removably secured to bow 5. Still other archery bow accessories can be employed without departing from the principles and scope of the invention.

An exemplary bracket 17 comprises a rectangular extension of metal that defines at least one opening received over cylinder 22. Bracket 17 includes the opening proximate an end and a slot 23 that extends through the bracket 17 from the opening to terminate at the end of bracket 17. Such allows peripheral portions of slot 23 defined by bracket 17 to separate slightly to enlarge the opening and facilitate receiving cylinder 22. Threaded members 27 are threaded through the peripheral portions of slot 23 to secure the opening closed around cylinder 22. An exemplary bracket 17 can be L-shaped as shown, generally straight, or other configurations. Additionally, the two brackets 17 can be configured generally identical or dissimilar. The exemplary bracket 17 comprises an end other than the end received over cylinder 22 and to define a dovetail horizontal adjustment. Such dovetail configuration can receive a bow accessory having a complementary configured dovetail slot. Materials other than metal can be used for brackets 17 without departing from the principles and scope of the invention. Moreover, brackets 17 may be oriented in other positions relative bow 5 without departing from the principles and scope of the invention. For example, brackets 17 may be rotated about cylinder 22 approximately 180° to position hood 13 and arrow clip 15 more proximate the drawstring 8 and cables 7 and 9. Accordingly, the quiver and plurality of arrows 19 secured therein would be closer to a user of bow 5.

Figures 2, 2A:
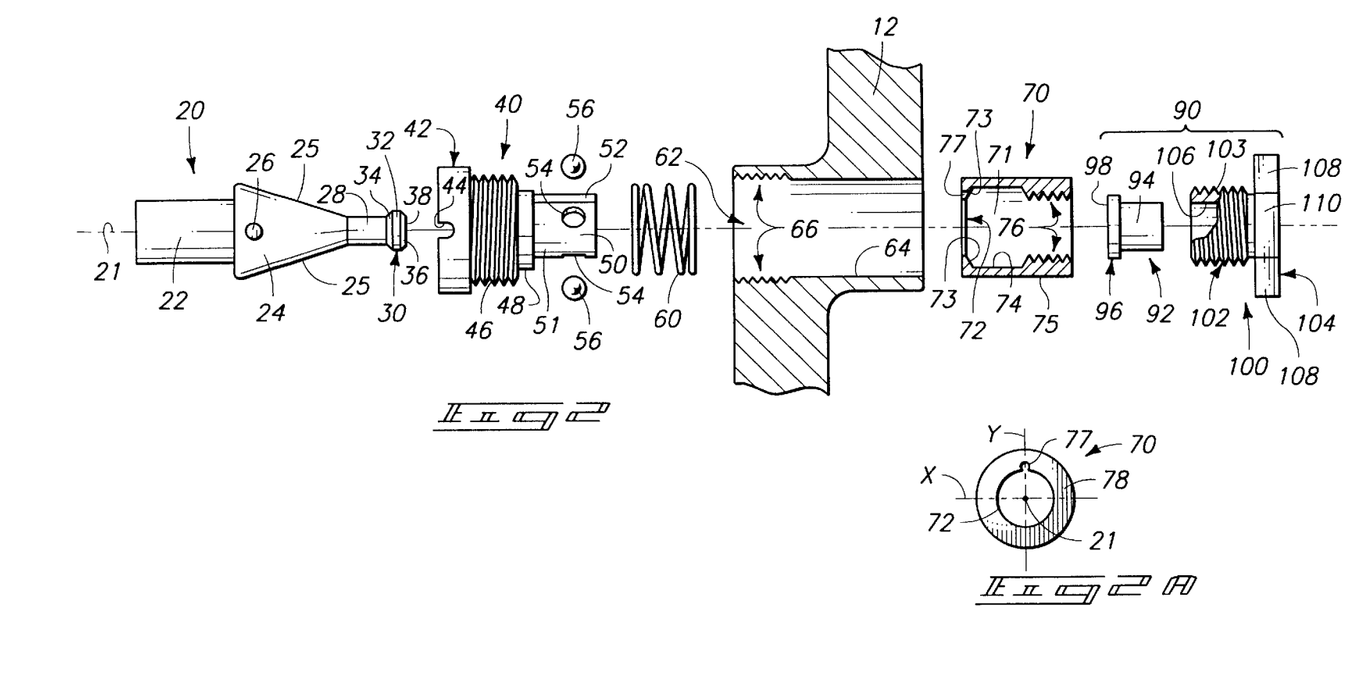
FIG. 2 is an exploded view of a connector apparatus for archery bow accessories in accordance with an embodiment of the present invention.
FIG. 2a is an end elevation view of a sleeve of the FIG. 2 connector apparatus in accordance with an embodiment of the present invention.

Referring to FIG. 2, connector apparatus 11 is shown oriented to be secured to handle 12 of bow 5 (FIG. 1) along an alignment axis. Such alignment axis corresponds to a bore axis 21 referred to throughout this document. In the shown embodiment, exemplary connector apparatuses 11 are identically designed and identically removably secured to handle 12, and accordingly, only one will be referred to during the subsequent description herein. A male member, or male portion 20 is aligned along alignment axis 21 and includes a cylindrical portion 22 and a conical portion 24 that extends axially from an end of the cylindrical portion 22. Conical surface 25 defines conical portion 24 and includes an apex spaced from cylindrical portion 22. The apex comprises a cylindrical stem 28. The cylindrical stem 28 terminates opposite the conical portion 24 to define an engagement portion 30. Engagement portion 30 comprises a central cylindrical portion 32 generally concentric with the cylindrical stem 28 about the bore axis 21. The central cylindrical portion 32 has a greater diametric dimension than the cylindrical stem 28 to define a greater cross-sectional area generally perpendicular to the bore axis 21. The engagement portion 30 includes two angled portions 34 and 36 angling downwardly from opposite respective sides of the central cylindrical portion 32 toward the bore axis 21. Angled portion 34 connects the central cylindrical portion 32 with cylindrical stem 28 and angled portion 36 terminates to form a planar surface 38 oriented generally perpendicularly to bore axis 21. A pin 26 extends generally perpendicularly to the bore axis 21 through the conical portion 24 of male portion 20 with opposite portions of pin 26 (both portions shown in FIG. 4) exposed outwardly of conical surface 25 on opposite sides of conical portion 24. An exemplary material for male portion 20 comprises metal, for example, steel. Materials other than metal can be used for male portion 20 without departing from the principles and scope of the invention.

Male portion 20 is positioned and aligned to be received in a female member, also referred to as a female portion or socket 40. Socket 40 forms a bore 45, a first bore (shown in FIG. 3), centrally oriented along the bore axis 21 to receive the male portion 20 in complementary fashion therein with the cylinder 22 axially exposed outward of socket 40 (shown in FIGS. 7–8). Socket 40 comprises a collar 42 that surrounds at least a portion of an opening to bore 45. The collar 42 includes a pair of slots 44 extending along bore axis 21 and radially outward relative the bore axis 21. The slots 44 are diametrically opposite one another. Slots 44 receive the exposed portions of pin 26 of male portion 20 to prevent rotation of male portion 20 about the bore axis 21 relative socket 40, and correspondingly, bow 5. Socket 40 further includes an outer threaded portion 46 that extends axially from collar 42 and a cylindrical receiving surface 48 that extends axially from outer threaded portion 46.

A cylindrical barrel 50 extends axially from cylindrical receiving surface 48 and comprises an outer surface 51. A linear guide portion 52 extends generally linearly along the length of the outer surface 51 generally parallel to the bore axis 21 and radially outward of the outer surface 51 relative the bore axis 21. The cylindrical barrel 50 defines a plurality of apertures 54, generally cylindrical apertures, peripherally spaced about the cylindrical barrel 50 and radially spaced from the bore axis 21. At least some of the plurality of apertures 54 define a plane generally perpendicular to the bore axis 21. Apertures 54 extend radially through the cylindrical barrel 50 relative the bore axis 21 to define radial axes relative the bore axis 21. Cylindrical apertures 54 receive ball bearings 56 therein for radial movement along the radial axes. A diameter of apertures 54 is defined smaller than diameters of the ball bearings 56 to prevent the ball bearings 56 from moving along the radial axes and slipping entirely into bore 45. An exemplary material for socket 40 comprises metal, for example, steel. Materials other than metal can be used for socket 40 without departing from the principles and scope of the invention.

It should be understood that other exemplary sockets 40 can include a cylindrical barrel 50 that defines only one aperture 54, or two or more apertures 54, radially spaced and radially extending relative the bore axis 21. Such other exemplary sockets 40 can include one ball bearing 56 received in the only one aperture 54, or one ball bearing 56 received in each one of the two or more apertures 54, for radial movement along the respective radial axes.

Still referring to FIG. 2, a fragmented portion of handle 12 is illustrated defining a bore 62, or a second bore, extending through the handle 12 along the bore axis 21 and opening on opposite sides of bow 5. Bore 62 includes a threaded portion 66 and a portion defining a cylindrical inner wall 64. Threaded portion 66 is configured to receive in complementary fashion outer threaded portion 46 of socket 40 and cylindrical inner wall 64 is configured to receive a sleeve 70. A biasing member 60 is positioned between socket 40 and sleeve 70 over cylindrical receiving surface 48 and cylindrical barrel 50 against threaded portion 46 of socket 40, and against sleeve 70. An exemplary biasing member 60 includes a compression spring.

Sleeve 70 comprises an outer cylindrical wall 75 for sliding engagement with cylindrical inner wall portion 64 along the bore axis 21 of bore 62. Sleeve 70 defines an opening 72 to an inner or central bore 71 that extends through sleeve 70 to opposite ends thereof. Central bore 71 includes a plurality of inner peripheries. One inner periphery is defined by opening 72 which has a peripheral configuration (see FIG. 2a) the same as a peripheral configuration of outer surface 51 of cylindrical barrel 50 of socket 40. However, opening 72 includes slightly larger dimensions to accommodate sliding axially over the cylindrical barrel 50 along bore axis 21. Another inner periphery comprises a cylindrical surface 74 axially spaced from the opening 72 and has a diametric dimension larger than diametric dimensions of opening 72. In between opening 72 and cylindrical surface 74 is a biasing surface 73 that is generally planar and angled relative the bore axis 21 to connect opening 72 and cylindrical surface 74. Biasing surface 73 defines a frusto-conical configuration surrounding bore axis 21. Accordingly, the diametric dimensions of central bore 71 increases as one moves along the bore axis 21 from opening 72 into central bore 71. Axially adjacent cylindrical surface 74, central bore 71 defines a threaded portion 76.

Referring to FIG. 2a, a front perspective of sleeve 70 is shown and oriented with a x-axis and a y-axis intersecting to define the point that bore axis 21 extends from the page. Sleeve 70 has a front face 78 which defines opening 72 and a slot 77. Front face 78 provides the surface to receive one end of biasing member 60. Slot 77 is configured to receive guide portion 52 for sliding engagement generally parallel and spaced from the bore axis 21. With guide portion 52 positioned through slot 77, sleeve 70 is prevented from rotation about bore axis 21 relative socket 40. An exemplary material for sleeve 70 comprises metal, for example, steel. Materials other than metal can be used for sleeve 70 without departing from the principles and scope of the invention.

Still referring to FIG. 2, a lock knob 90 is oriented along the alignment axis 21 to be receive in sleeve 70 and comprises two components, a cap screw 100 and biasing spacer 92. Cap screw 100 includes a shaft 102 with an outer threaded surface 103 and an inner surface defining a cap bore 106. The cap screw 100 includes a head portion 104 axially adjacent one end of the shaft 102. Head portion 104 has an outer periphery comprised of arcuate portions 108 intermittent with planar portions 110 (only one shown) and a peripheral configuration that is larger than a diameter of the shaft 102. Such configuration aspects of the head portion 104 facilitates finger manipulation of same to rotate the lock knob 90 about the bore axis 21. A biasing surface or spacer 92 includes an engagement cylinder 94 and an abutment collar 96 wherein both are generally cylindrical with the abutment collar 96 having the larger diametric dimensions. The engagement cylinder 94 is configured to be axially received in the cap bore 106 of cap screw 100 and secured therein by an adhesive with abutment collar 96 adjacent shaft 102. An exemplary adhesive is glue. Abutment collar 96 includes an exposed surface 98 generally perpendicular to bore axis 21 and oriented to be received in sleeve 70 prior to the rest of lock knob 90. An exemplary configuration of exposed surface 98 includes a concave configuration (see FIG. 3). The outer threaded surface 103 of cap screw 100 is configured to be complementarily received in the threaded portion 76 for infinitely incremental adjustments and positioning relative the sleeve 70 along the bore axis 21. An exemplary material for cap screw 100 comprises metal, for example, steel. Materials other than metal can be used for cap screw 100 without departing from the principles and scope of the invention. An exemplary material for the biasing spacer 92 includes nylon, for example, nylon 101, manufactured by Quadrant Engineering Plastic Products (previously DSM Engineering Plastic Products) at 2120 Fairmont Ave., P.O. Box 4235, Reading, Pa. 19612-4235. Materials other than nylon can be used for biasing spacer 92 without departing from the principles and scope of the invention.

Method of Operation

Figure 3:
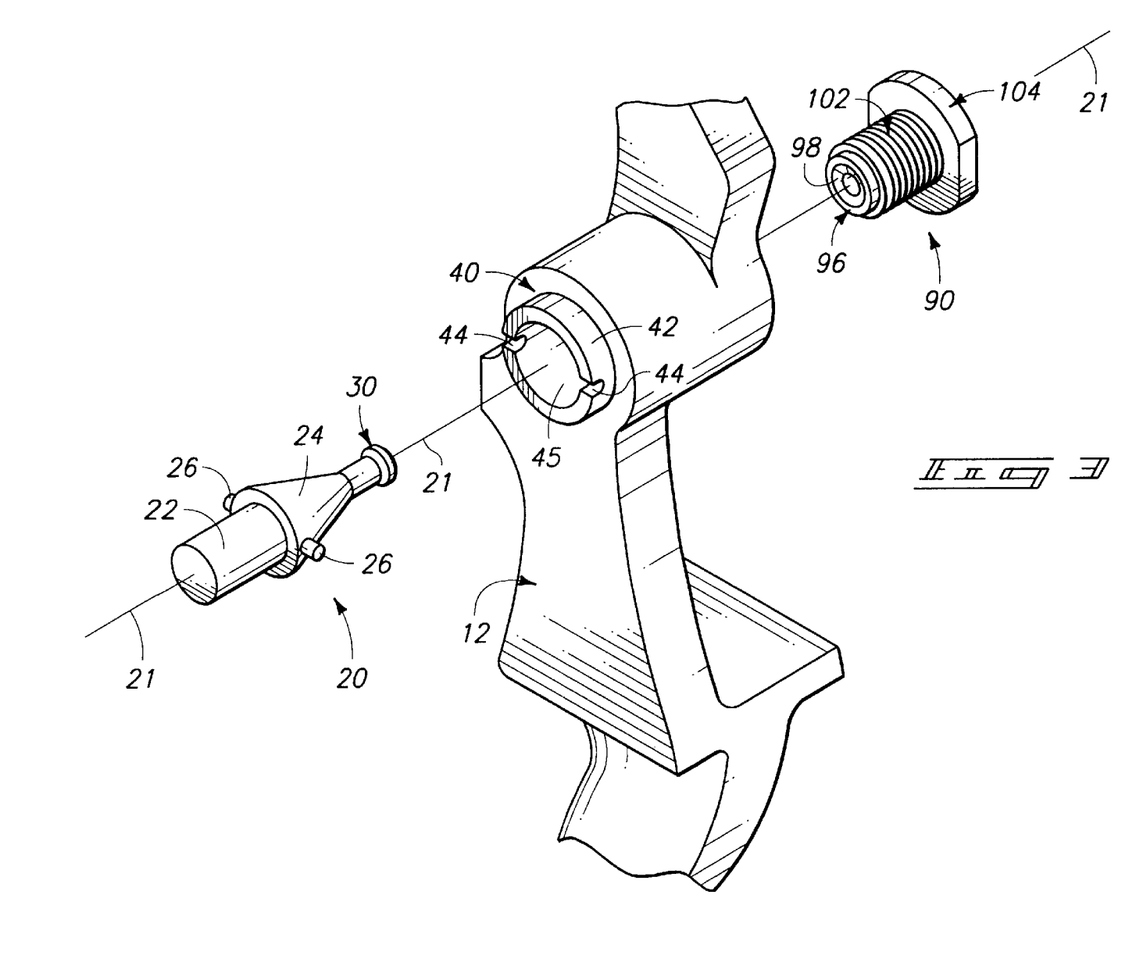
FIG. 3 is a fragmentary perspective view of a connector apparatus at one method step for removably securing the connector apparatus to the archery bow in accordance with an embodiment of the present invention.

Referring to FIGS. 3–8, an exemplary method of removably securing the male portion 20 and lock knob 90 to handle 12 of bow 5 is illustrated according to an exemplary embodiment of the present invention. Referring to FIG. 3, socket 40, biasing member 60 (not shown) and sleeve 70 (not shown) are already positioned in bore 62 of handle 12 and the cooperation of these components of connection apparatus 11 are illustrated and described with reference to FIGS. 4–8. An exemplary bow 5 could be purchased with the such components (socket 40, biasing member 6, and sleeve 70) already positioned in bore 62, or with any combination of assembly desired. Socket 40 is threaded into handle 12 with collar 42 adjacent a side thereof. Male portion 20 is oriented along alignment axis 21 (or bore axis) to be received in bore 45 of socket 40 with the engagement portion 30 of male portion 20 to enter the bore 45 first and leaving cylinder 22 extending outwardly away from handle 12. Male portion 20 is aligned relative socket 40 for the exposed portions of pin 26 to be received in slots 44 of collar 42. Engagement cylinder 94 (not shown) of biasing spacer 92 is positioned in cap bore 106 of cap screw 100 to finish assembly of lock knob 90. Lock knob 90 is oriented along the bore axis 21 for threaded engagement with sleeve 70 (not shown) and facing a side of handle 12 opposite the male portion 20.

Figure 4:
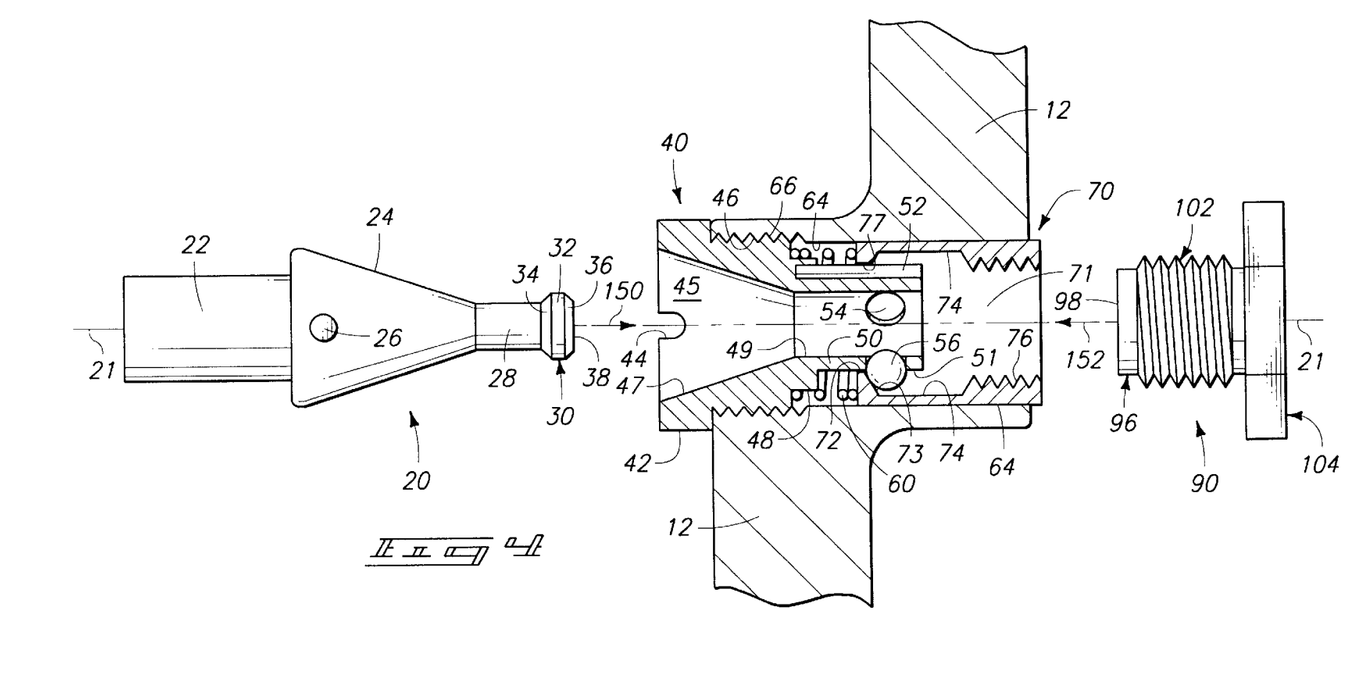
FIG. 4 is a partially exploded and partial sectional, side view of a connector apparatus at the one method step of FIG. 3.

Referring to FIG. 4, a sectional view of handle 12 of FIG. 3 is shown and illustrates the orientation and cooperation of socket 40, biasing member 60 and sleeve 70 in bore 62 according to an exemplary embodiment of the invention. Socket 40 is removably secured to handle 12 with cylindrical barrel 50 positioned in bore 62 and extending through into central bore 71 of sleeve 70 along the bore axis 21. Bore 45 of socket 40 is defined by conical inner surface 47 and cylindrical inner surface 49 provided in the barrel 50. Conical inner surface 47 is configured for complementary receipt of conical surface 25 of male portion 20 and cylindrical inner surface 49 is configured for complementary receipt of engagement portion 30 of male portion 20. Guide portion 52 of socket 40 rides in slot 77 of sleeve 70. The following description refers to only one ball bearing 56 and respective aperture 54 for clarity. It should be understood the following description can apply equality to each respective ball bearing and aperture of a plurality of ball bearings and apertures as each ball bearing 56 can be configured the same and each aperture 54 can be configured the same. Ball bearing 56 is positioned in aperture 54 for radial axial movement therein. Biasing member 60 provides a biasing force on sleeve 70 generally parallel to the bore axis 21 to axially move sleeve 70 until biasing surface 73 engages a peripheral portion of ball bearing 56 outward of outer surface 51. Biasing surface 73 applies a biasing force on ball bearing 56 directed generally perpendicularly outwardly from biasing surface 73. Accordingly, there is a force component of the biasing force on the ball bearing 56 directed along the radial axis to drive the ball bearing 56 radially inward toward the bore axis 21 until further radial movement is prevented due to the larger diameter of the ball bearing 56 relative the diameter of the aperture 54.

Such position of the ball bearing 56 radially inward most proximate the bore axis 21 defines a first ball bearing position. The first ball bearing position has a peripheral portion of ball bearing 56 in bore 45 defined by cylindrical inner surface 49 and an other peripheral portion of outward of cylindrical barrel 50 in central bore 71 of sleeve 70. It should be understood that with each of the plurality of ball bearings 56 biased in the first ball bearing position, the collective peripheral portions of the plurality of ball bearings 56 positioned in bore 45 define a periphery hereinafter referred to as a biased periphery. It should be understood the biased periphery is established in bore 45 with outermost points of the ball bearing peripheries within bore 45 defining points most proximate the bore axis 21. Such points of the ball bearing peripheries most proximate the bore axis 21 collectively define a cross-sectional plane with dimensions that are less than diametric dimensions defined by central cylindrical portion 32 of engagement portion 30. Accordingly, as engagement portion 30 is moved axially along the bore axis 21 through bore 45, engagement portion 30 engages the ball bearings 56 to move same radially outward as the engagement portion 30 moves past the ball bearings 56 relative collar 42. Moreover, it should be understood that the radial movement of the plurality of ball bearings 56 leave peripheral portions always outward of outer surface 51 of cylindrical barrel 50. Accordingly, opening 72 of sleeve 70 is maintained between threaded portion 46 and ball bearings 56. Outer cylindrical wall 75 (FIG. 2) of sleeve 70 slidingly engages inner wall 64 of bore 62. Sleeve 70 is biased away from socket 40 by biasing member 60 to leave a portion of sleeve 70 defining threaded portion 76 outward of bore 62 and handle 12.

Male portion 20 is positioned to be moved along direction arrow 150, which is collinear with the bore axis 21, into bore 45 of socket 40. Lock knob 90 is positioned to be moved along direction arrow 152, which is collinear with the bore axis 21, into central bore 71 of sleeve 70. In one exemplary embodiment of the present invention, the male portion 20 is moved along direction arrow 150 and positioned in bore 45 before lock knob 90 is moved along direction arrow 152 and positioned in central bore 71. In an other exemplary embodiment of the present invention, the male portion 20 is positioned after lock knob 90 is positioned.

Figure 5:
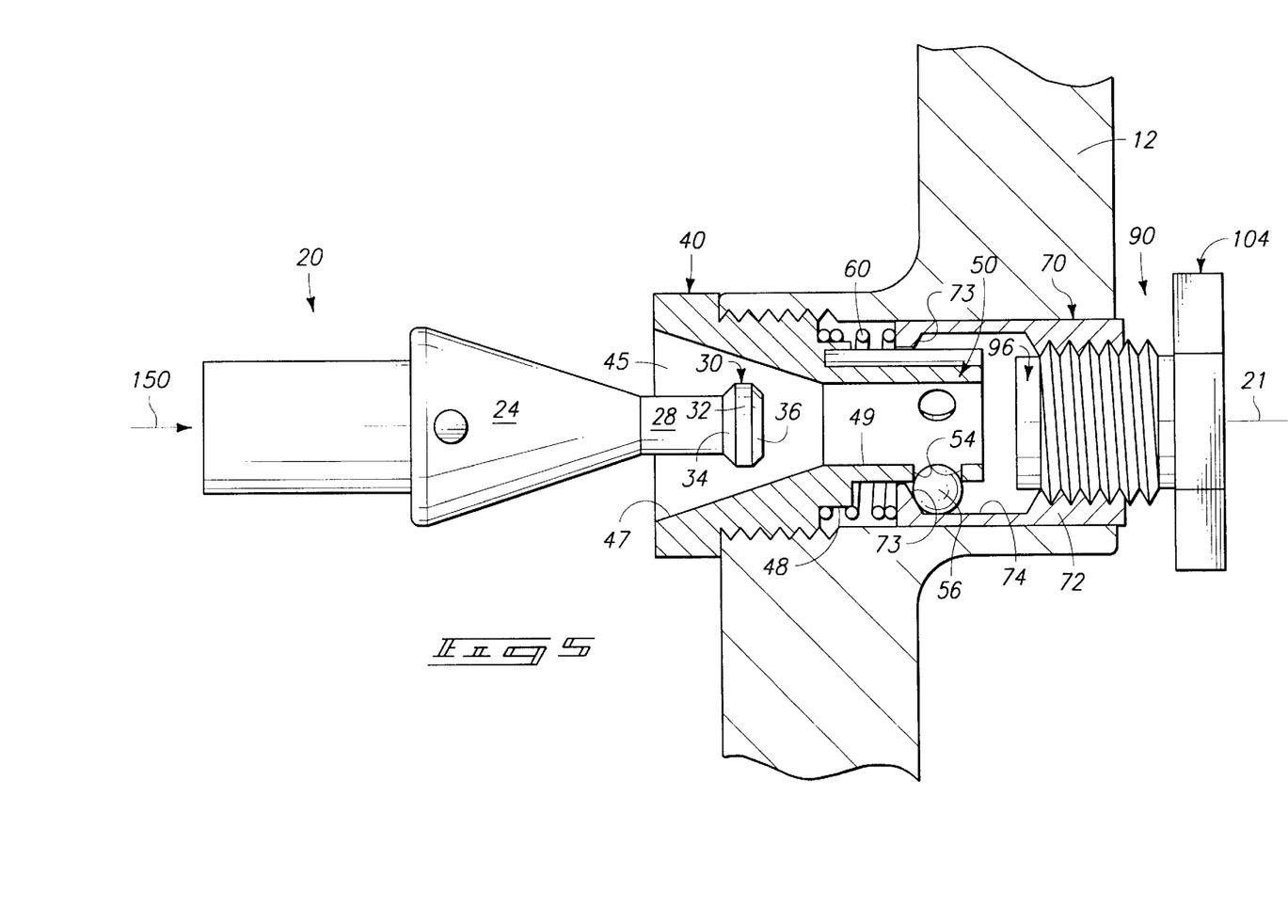
FIG. 5 is a view of the FIG. 4 connector apparatus at a method step subsequent to that shown in FIG. 4.

Referring to FIG. 5, lock knob. 90 is axially secured in sleeve 70 and axially spaced from the socket 40. A pressure force is applied to the lock knob 90 generally parallel to the bore axis 21 toward socket 40 and is contrary to the force provided by biasing member 60 to move the sleeve 70 toward the cylindrical receiving surface 48 of socket 40. An exemplary pressure force is provided by finger manipulation of the head portion 104 of lock knob 90. An exemplary axially movement of sleeve 70 releases the biasing force that biasing surface 73 applies to ball bearing 56 and allows the ball bearing 56 to move along the radial axis 21 outward from the bore axis 21. Such release of the biasing force provides for a position of ball bearing 56 most outwardly removed from the bore axis 21 along the radial axis and defines a second ball bearing position. The second ball bearing position is established by peripheral portions of the ball bearing 56 resting against the cylindrical surface 74 of central bore 71. Accordingly, the cylindrical surface 74 prevents the ball bearing 56 from any further outward movement relative the bore axis 21 along the radial axis. In the second ball bearing position, a peripheral portion of the ball bearing 56 remains in the aperture 54 of socket 40. Accordingly, it should be understood that a portion of ball bearing 56 is always contained in aperture 54, and therefore, ball bearing 56 is secured in aperture 54 for movement along the radial axis between the first and second ball bearing positions. Male portion 20 is continually moved along direction arrow 150 into bore 45 of socket 40.

Figure 6:
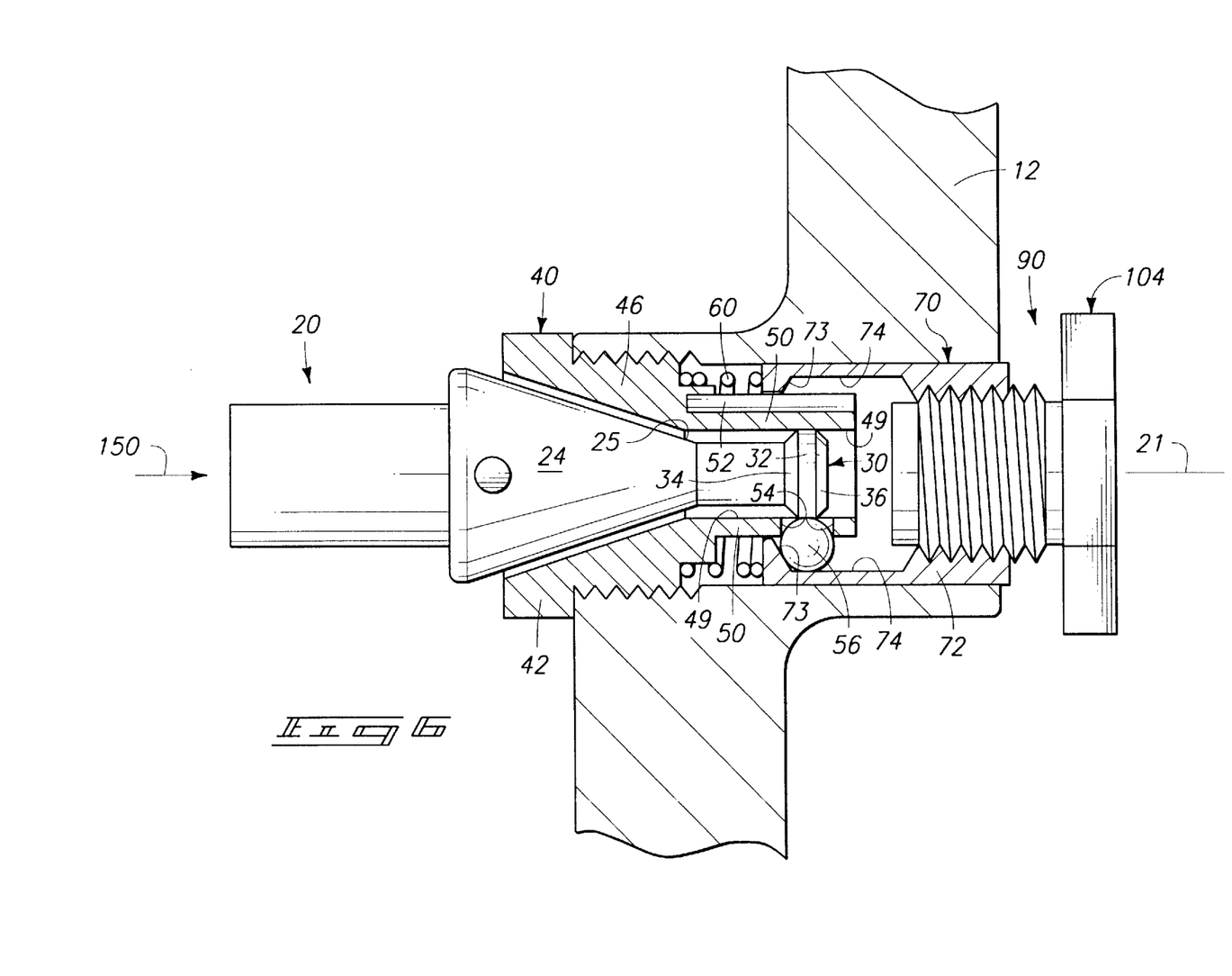
FIG. 6 is a view of the FIG. 4 connector apparatus at a method step subsequent to that shown in FIG. 5.

Referring to FIG. 6, male portion 20 has moved substantially into bore 45 of socket 40. The engagement portion 30 of male portion 20 moves into the plane defined by the plurality of cylindrical apertures 54 and biases the ball bearings 56 radially outward of bore 45 defined by cylindrical inner surface 49. In the exemplary embodiment shown, a pressure force is continually applied to lock knob 90 to release any biasing force applied to the ball bearing 56 by biasing surface 73. Accordingly, a magnitude of force provided to male portion 20 to move the central cylindrical portion 32 past the plane defined by the plurality of cylindrical apertures 54 to overcome any biasing force applied to the ball bearings 56. That is, the engagement portion 30 of male portion 20 does not have to engage the ball bearing 56 and bias the same outward from the cylindrical inner surface 49 along the radial axis.

Another exemplary embodiment of the present invention includes not applying a biasing force to lock knob 90 so that biasing member 60 is allowed to provide the biasing force on ball bearings 56 while male portion 20 is moved into socket 40. Accordingly, a magnitude of force provided to male portion 20 to move the central cylindrical portion 32 past the plurality of apertures 54 would have to be sufficient to overcome the biasing force applied on ball bearings 56 resulting from biasing member 60. That is, the engagement portion 30 of male portion 20 would engage the ball bearing 56 and bias the same outward from the cylindrical inner surface 49 along the radial axis. In such an exemplary embodiment, as the engagement portion 30 moves along the cylindrical inner surface 49, angled portion 36 engages and biases ball bearings 56 radially outward to facilitate the axial movement of engagement portion 30.

Figure 7:
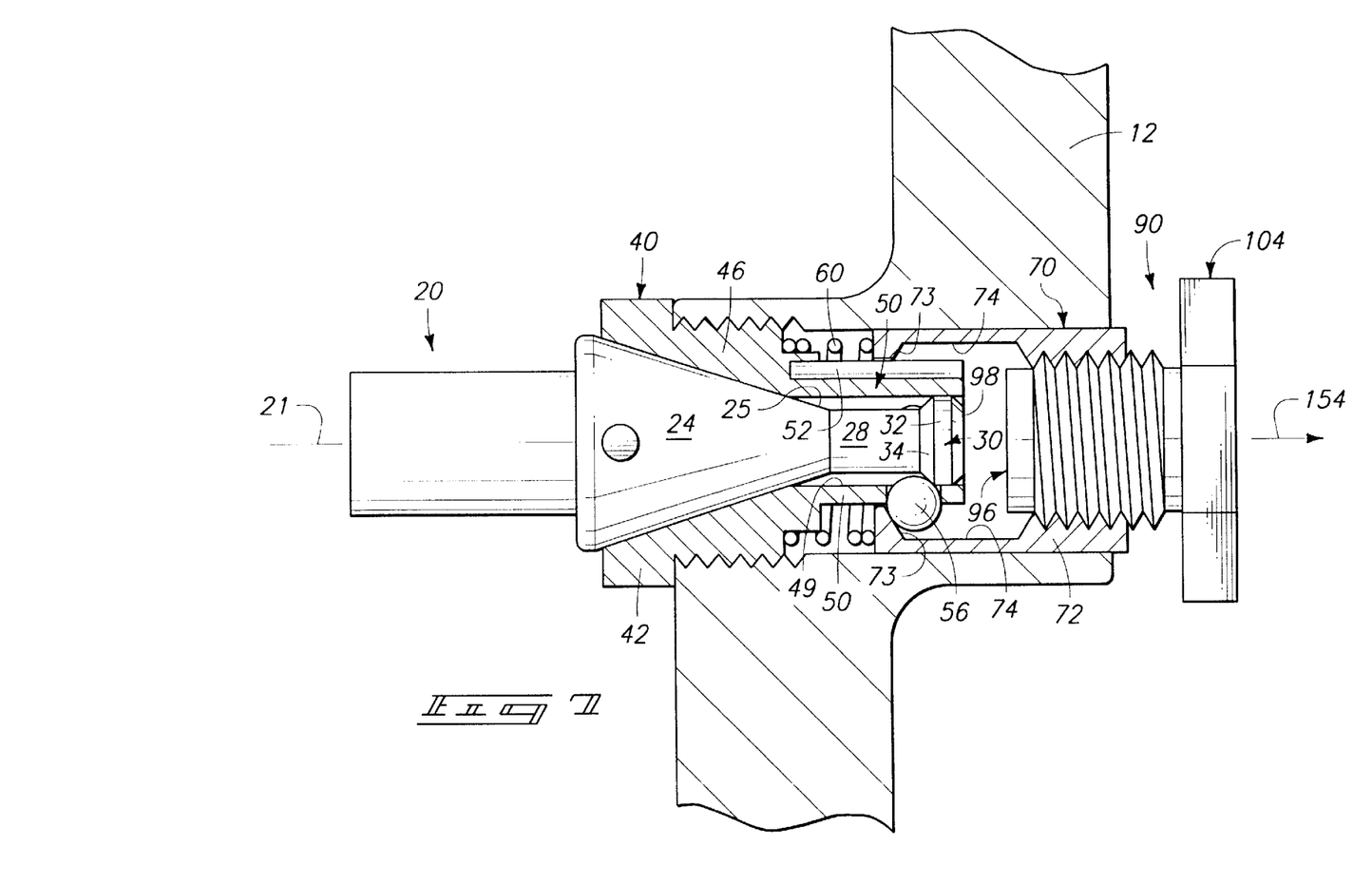
FIG. 7 is a view of the FIG. 4 connector apparatus at a method step subsequent to that shown in FIG. 6.

Referring to FIG. 7, engagement portion 30 of male portion 20 moves past the plane defined by the plurality of apertures 54 and past the ball bearings 56. Any biasing force applied to the lock knob 90 is released. Accordingly, sleeve 70 returns to the position defined by the biasing force applied by biasing member 60, and biasing surface 73 again biases the ball bearing 56 inward along the radial axis to the first ball bearing position. A peripheral portion of ball bearing 56 is proximate angled portion 34 of engagement portion 30 and prevents male portion 20 from being removed from socket 40 without applying a biasing force along bore axis 21 away from socket 40. If male portion 20 is to be removed from socket 40 at this juncture of the exemplary method of operation, angled portion 34 facilitates biasing the ball bearings 56 radially outward from bore axis 21 as engagement portion 30 moves along the cylindrical inner surface 49 of bore 45. It should be understood, at this juncture of the exemplary method of operation, that biasing force acting on the ball bearings 56 is the result and dependent upon biasing member 60.

Figure 8:
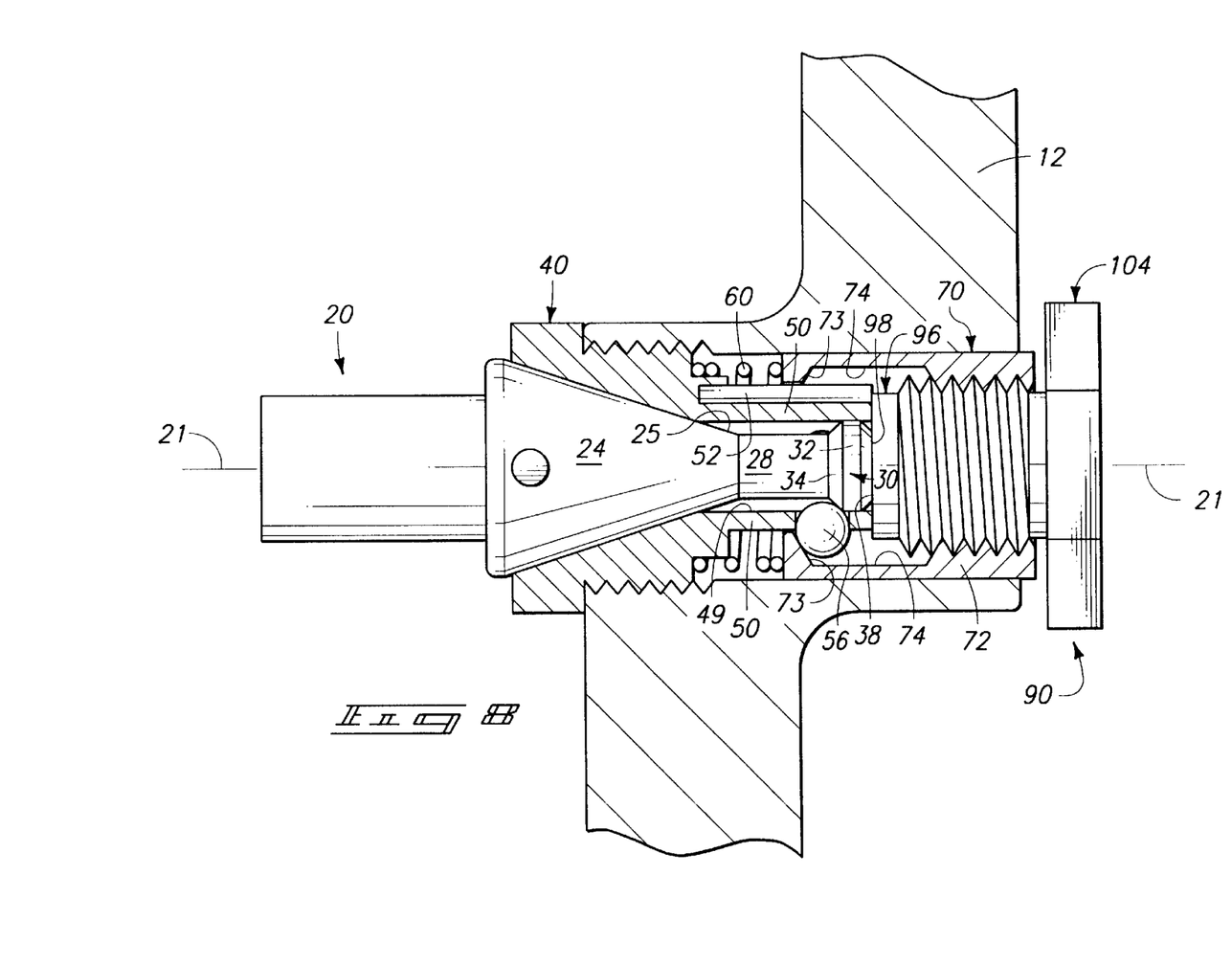
FIG. 8 is a view of the FIG. 4 connector apparatus at a method step subsequent to that shown in FIG. 7.

Referring to FIG. 8, head portion 104 is manipulated to rotate the lock knob 90 clockwise about the bore axis 21 to move the lock knob 90 axially toward the socket 40 and allow exposed surface 98 to engage e and abut against the cylindrical barrel 50. Once the exposed surface 98 59 of abutment collar 96 engages the cylindrical barrel 50, sleeve 70 is biased away from socket 40 providing a biasing force on ball bearing 56 by biasing surface 73. An incremental, additional rotation of lock knob 90 produces an increased magnitude of biasing force component acting on ball bearings 56 (relative the biasing force component dependent on biasing member 60) to lock same in the first ball bearing position. Consequently, the male portion 20 is locked into socket 40, and correspondingly, any archery bow accessory secured to male portion 20 is locked to bow 5. Additionally, the nylon material of biasing spacer 92 provides for a slight compression of nylon material as exposed surface 98 presses against the cylindrical barrel 50. Accordingly, a slight locking action is produced between the lock knob 90 and socket 40 to facilitate the prevention of rotation of either component about the bore axis 21.

It should be understood that reversing the order of steps of removably securing the male portion 20 to socket 40 and lock knob 90 to sleeve 70 as described previously regarding reference to FIGS. 3–8 will remove the male portion 20 and lock knob 90 from handle 12 of bow 5.

Beginning at the step disclosed in FIG. 8, an exemplary method of removing the male portion 20 from socket 40 includes rotating the lock knob 90 counterclockwise, only a slight incremental rotation is desired, to remove the exposed surface 98 of abutment collar 96 from abutment against cylindrical barrel 50 of socket 40. Next, applying a biasing force on the head portion 104 of lock knob 90 directed toward the socket 40 releases the ball bearings 56 from being biased toward the bore axis 21. Accordingly, the male portion 20 can be removed from socket 40 with the lock knob 90 remaining partially threaded into sleeve 70, and therefore, remaining removably secured to handle 12 and bow 5. The male portion 20 can be removed by hand by applying a biasing force away from handle 12 with a magnitude to overcome the biasing force resulting from biasing member 60.

Alternatively, while applying a biasing force to lock knob 90, orient the bow 5 with the bore axis 21 vertical relative the ground and the male portion 20 underneath the bow 5 relative the ground. Applying the biasing force releases the ball bearings 56 from holding the male portion 20 in the socket 40 and the gravitational force will move the male portion 20 out of socket 40.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A connector apparatus for removably securing an archery bow accessory to an archery bow, the connector apparatus comprising:
   a female member removably secured to an archery bow and defining an opening to a first bore extending along a bore axis;
   at least one ball bearing within the female member and configured for radial movement relative the bore axis, the at least one ball bearing having a peripheral portion within the first bore; and
   a male member comprising a first portion configured for removably securing an archery bow accessory thereon and a second portion spaced from the first portion and configured for positioning axially past the at least one ball bearing relative the opening with the peripheral portion of the at least one ball bearing biased radially more proximate the bore axis than a periphery defined by the second portion.

2. The apparatus of claim 1 wherein the at least one ball bearing comprises a plurality of ball bearings peripherally spaced about the first bore, the plurality of the ball bearings configured for radial movement relative the bore axis, and at least some of the plurality of the ball bearings defining a plane perpendicular to the bore axis.

3. The apparatus of claim 2 wherein the female member has an outer wall defining a plurality of apertures extending to the first bore, wherein each aperture receives one of the plurality of the ball bearings for the radial movement therein, and wherein the plurality of apertures have diameters smaller than diameters of the plurality of the ball bearings.

4. The apparatus of claim 1 wherein the archery bow defines a second bore and the female member is removably secured in the second bore.

5. The apparatus of claim 1 wherein the archery bow defines a second bore and the female member is removably secured in the second bore by threaded engagement.

6. The apparatus of claim 1 further comprising a bracket having a first end removably secured to the first portion of the male member and a second end removably secured to the archery bow accessory.

7. The apparatus of claim 1 wherein the first portion of the male member comprises a cylinder to receive the archery bow accessory for the removable securement.

8. The apparatus of claim 1 wherein the male member further comprises a linear pin extending therethrough generally perpendicularly to the bore axis with portions outward of opposite sides of the male member, and wherein the opening of the female member comprises a collar surrounding at least a portion of the opening, the collar having a pair of diametrically spaced slots configured to receive the portions of the linear pin, the slots extending parallel to the bore axis and terminating spaced from the opening.

9. The apparatus of claim 1 wherein the female member has an outer wall defining an aperture extending to the first bore, wherein the aperture receives the at least one ball bearing for the radial movement therein, and wherein the aperture has a diameter smaller than a diameter of the at least one ball bearing.

10. A connector apparatus for removably securing an archery bow accessory to an archery bow, the connector apparatus comprising:
- a female member removably secured to an archery bow and defining an opening to a first bore extending along a bore axis, the female member having an outer surface defining at least one aperture extending to the first bore;
- a ball bearing received in the at least one aperture and configured for radial movement therein relative the bore axis, the ball bearing having a peripheral portion outward of the outer surface of the female member during the radial movement;
- a male member comprising a first portion configured for removably securing an archery bow accessory thereon and a second portion spaced from the first portion, the second portion defining a periphery configured for positioning axially past the ball bearing relative the opening; and
- a sleeve defining an inner bore configured for sliding engagement over the outer surface of the female member, the inner bore having a peripheral configuration to engage and bias the ball bearing during the sliding engagement, the biasing of the ball bearing comprising moving the ball bearing radially more proximate the bore axis than the periphery of the second portion of the male member.

11. The apparatus of claim 10 wherein the female member comprises a guide portion extending linearly along the outer surface generally parallel to the bore axis and radially outwardly relative the bore axis from the outer surface, and wherein the sleeve defines a slot extending along the bore axis to receive the guide portion as the sleeve moves axially over the female member.

12. The apparatus of claim 10 wherein the sleeve defines opposite ends and the inner bore extends to the opposite ends, one end over the outer surface of the female member, and the apparatus further comprising a biasing surface received in the other end of the sleeve and configured for infinitely incremental adjustments and positioning relative the sleeve along the bore axis, the biasing surface configured to move axially within the sleeve to abut against the female member and bias the sleeve away from the female member wherein the peripheral configuration of the inner bore engages and biases the ball bearing.

13. The apparatus of claim 10 further comprising a biasing member secured between the female member and the sleeve to bias the sleeve away from the female member along the bore axis, wherein the peripheral configuration of the inner bore engages and biases the ball bearing radially toward the bore axis.

14. The apparatus of claim 13 wherein the biasing member comprises a compression spring.

15. An archery bow comprising:
- a handle having a first end opposite a second end, the handle having a first opening extending therethrough;
- a female member removably received in the first opening and defining a second opening to a bore extending along a bore axis, the female member having an outer surface;
- a plurality of ball bearings secured in the female member, at least some of the plurality of ball bearings configured for radial movement relative the bore axis with peripheral portions of the at least some of the plurality of ball bearings outward of the outer surface during the radial movement, and the at least some of the plurality of ball bearings peripherally spaced about the bore in a plane perpendicular to the bore axis;
- a sleeve defining an inner bore configured to slide axially over the outer surface of the female member and engage and bias the at least some of the plurality of ball bearings radially toward the bore axis;
- a first limb extending outwardly from the first end of the handle and a second limb extending outwardly from the second end of the handle; and
- at least one string extending between distal ends of the limbs.

16. The bow of claim 15 further comprising a male member having a first portion configured for removably securing an archery bow accessory thereon and a second portion spaced from the first portion, the second portion defining a periphery configured for positioning axially in the bore of the female member past the at least some of the plurality of ball bearings relative the second opening, wherein axially moving the sleeve allows the inner bore to engage and bias the at least some of the plurality of ball bearings radially toward the bore axis more proximate the bore axis than the periphery of the second portion of the male member.

17. The bow of claim 16 wherein the sleeve comprises an end between the second opening of the female member and the at least some of the plurality of ball bearings, the end defining the inner bore with a first peripheral configuration for sliding engagement over the outer surface of the female portion, the first peripheral configuration smaller relative the bore axis than a periphery defined by the peripheral portions of the at least some of the plurality of ball bearings outward of the outer surface of the female portion.

18. The bow of claim 17 wherein the sleeve defines a second peripheral configuration of the inner bore spaced from the end, the second peripheral configuration larger relative the bore axis than the first peripheral configuration, and the sleeve defines a third peripheral configuration of the inner bore between and connecting the first and second peripheral configurations.

19. The bow of claim 18 wherein the at least some of the plurality of ball bearings biased the most proximate the bore axis is established by axially sliding the end of the sleeve away from the second opening of the female member to provide the third peripheral configuration engaging the at least some of the plurality of ball bearings.

20. The bow of claim 18 wherein the second peripheral configuration positioned over the at least some of the plurality of ball bearings allows the same to radially move freely between the second peripheral configuration and the female member.

21. The bow of claim 15 wherein the female member defines a plurality of apertures with each aperture extending between the outer surface and the bore to receive one of the at least some of the plurality of ball bearings for the radial movement, the plurality of apertures having diametric dimensions smaller than diametric dimensions of the at least some of the plurality of ball bearings.

22. The bow of claim 15 further comprises a biasing member between the sleeve and female member to bias the sleeve axially away from the female member, wherein sliding the sleeve along the bore axis away from the female member allows the configuration of the inner bore to engage and bias the at least some of the plurality of ball bearings radially toward the bore axis.

23. The bow of claim 15 wherein the handle comprises opposite sides and defines the first opening to extend to the opposite sides wherein the sleeve comprises a portion exposed from one side, and wherein biasing the exposed portion along the bore axis toward the female member releases the sleeve from engaging the at least some of the plurality of ball bearings.

24. The bow of claim 15 wherein the handle comprises opposite sides and defines the first opening to extend to the opposite sides, wherein the sleeve defines opposite ends and the inner bore extends to the opposite ends, one end provided over the outer surface of the female member and the other end exposed from one side of the handle, and the bow further comprising a biasing surface received in the other end of the sleeve and configured for infinitely incremental, adjustments and positioning relative the sleeve along the bore axis, the biasing surface configured to move axially within the sleeve to abut against the female member and bias the sleeve away from the female member.

25. A method for removably securing an archery bow accessory to an archery bow, the method comprising:

providing an archery bow defining an opening extending from a first side to an opposite second side, the bow comprising a female member defining a bore extending along a bore axis and removably received in the opening of the bow with the bore accessible from the first side, the female member having an outer surface positioned in the opening; a plurality of ball bearings secured in the female member, at least some of the plurality of ball bearings configured for radial movement relative the bore axis with peripheral portions of each ball bearing outward of the outer surface during the radial movement, the at least some of the plurality of ball bearings peripherally spaced about the bore generally in a plane perpendicular to the bore axis; a sleeve defining an inner bore configured for sliding engagement over the outer surface of the female member, the inner bore having a peripheral configuration to engage and bias the at least some of the plurality of ball bearings as the sleeve is biased axially away from the female member, the biasing of the at least some of the plurality of ball bearings comprising moving the ball bearings radially toward the bore axis, the inner bore accessible from an end of the sleeve exposed from the second side of the archery bow; and a biasing member between the female member and sleeve to bias the sleeve axially away from the female member;

providing a male member having a first portion configured for removably securing an archery bow accessory thereon and a second portion spaced from the first portion, the second portion defining a periphery; and positioning the periphery of the second portion of the male member past the at least some of the plurality of ball bearings relative the first side.

26. The method of claim 25 further comprising applying a biasing force to the end of the sleeve to counter the biasing provided by the biasing member and moving the sleeve axially toward the first side to release the engagement of the at least some of the plurality of ball bearings prior to the positioning the periphery of the second portion.

27. The method of claim 25 further comprising securing an archery bow accessory to the first portion of the male member.

28. The method of claim 25 further comprising securing an archery bow accessory to the first portion of the male member prior to the positioning the periphery of the second portion.

29. The method of claim 25 further comprising securing an archery bow accessory to the first portion of the male member after the positioning the periphery of the second portion.

30. The method of claim 25 further comprising:

providing a biasing surface received in the inner bore at the end of the sleeve and configured for infinitely incremental adjustments and positioning relative the sleeve along the bore axis; and adjusting the biasing surface to move axially within the sleeve to abut against the female member and bias the sleeve axially away from the female member.

31. The method of claim 25 further comprising:

providing a biasing surface received in the inner bore at the end of the sleeve and configured for infinitely incremental adjustments and positioning relative the sleeve along the bore axis, the biasing surface having a portion extending outward of the second side of the bow; and applying a biasing force to the portion of the biasing surface to counter the biasing force provided by the biasing member and moving the sleeve toward the first side to release the engagement of the at least some of the plurality of ball bearings.

32. The method of claim 25 further comprising:

providing a biasing surface received in the inner bore at the end of the sleeve and configured for infinitely incremental adjustments and positioning relative the sleeve along the bore axis, the biasing surface having a portion extending outward of the second side of the bow; and prior to the positioning the periphery of the second portion, applying a biasing force to the portion of the biasing surface to counter the biasing force provided by the biasing member and moving the sleeve toward the first side to release the engagement of the at least some of the plurality of ball bearings.

33. The method of claim 25 further comprising:

providing a bracket with at least two ends;

removably securing one end of the bracket to the first portion of the male member; and removably securing an archery bow accessory to an other end of the bracket.

34. The method of claim 25 further comprising:

providing a bracket with at least two ends;

prior to the positioning the periphery of the second portion, removably securing one end of the bracket to the first portion of the male member; and prior to the positioning the periphery of the second portion, removably securing an archery bow accessory to an other end of the bracket.

* * * * *